(12) United States Patent
Askan

(10) Patent No.: US 11,075,513 B2
(45) Date of Patent: Jul. 27, 2021

(54) CIRCUIT BREAKER

(71) Applicant: Eaton Intelligent Power Ltd., Dublin (IE)

(72) Inventor: Kenan Askan, Vienna (AT)

(73) Assignee: EATON INTELLIGENT POWER LIMITED, Dublin (IE)

( * ) Notice: Subject to any disclaimer, the term of this patent is extended or adjusted under 35 U.S.C. 154(b) by 39 days.

(21) Appl. No.: 16/702,673

(22) Filed: Dec. 4, 2019

(65) Prior Publication Data
US 2020/0185904 A1 Jun. 11, 2020

(30) Foreign Application Priority Data

Dec. 7, 2018 (GB) ..................................... 1820015

(51) Int. Cl.
| | | |
|---|---|---|
| H02M 3/00 | (2006.01) | |
| H02H 3/033 | (2006.01) | |
| H02H 1/00 | (2006.01) | |
| H02H 3/02 | (2006.01) | |
| H02H 3/10 | (2006.01) | |

(52) U.S. Cl.
CPC .......... *H02H 3/033* (2013.01); *H02H 1/0007* (2013.01); *H02H 1/0092* (2013.01); *H02H 3/021* (2013.01); *H02H 3/105* (2013.01)

(58) Field of Classification Search
CPC .... H02H 3/033; H02H 1/0007; H02H 1/0092; H02H 3/021; H02H 3/105
See application file for complete search history.

(56) References Cited

U.S. PATENT DOCUMENTS

| | | | |
|---|---|---|---|
| 7,468,876 B2 * | 12/2008 | Sullivan | B66B 1/06 361/93.1 |
| 2015/0303676 A1 | 10/2015 | Hertz et al. | |
| 2016/0204596 A1 * | 7/2016 | Horinouchi | H01H 9/547 361/101 |
| 2018/0019084 A1 * | 1/2018 | Kim | H02H 3/087 |

FOREIGN PATENT DOCUMENTS

| | | |
|---|---|---|
| GB | 2520529 A | 5/2015 |
| WO | WO 2015028634 A1 | 3/2015 |
| WO | WO 2017220443 A1 | 12/2017 |

* cited by examiner

*Primary Examiner* — Adolf D Berhane
*Assistant Examiner* — Afework S Demisse
(74) *Attorney, Agent, or Firm* — Leydig, Voit & Mayer Ltd.

(57) ABSTRACT

A circuit breaker is proposed, comprising a live line and a neutral line and a semiconductor switching unit located in the live line, the circuit breaker further comprises a bypass line, which is connected in parallel to the semiconductor switching unit, with a first mechanical switch and a second mechanical switch located in the bypass line, with the first mechanical switch connected in series to the second mechanical switch, whereby the semiconductor switching unit, the first mechanical switch and the second mechanical switch are controlled by a processing unit of the circuit breaker, which is embodied to send a first opening command to the first mechanical switch in case of a short-circuit-detection, and sending a second opening command to the second mechanical switch a time-delay after sending of the first opening command.

10 Claims, 1 Drawing Sheet

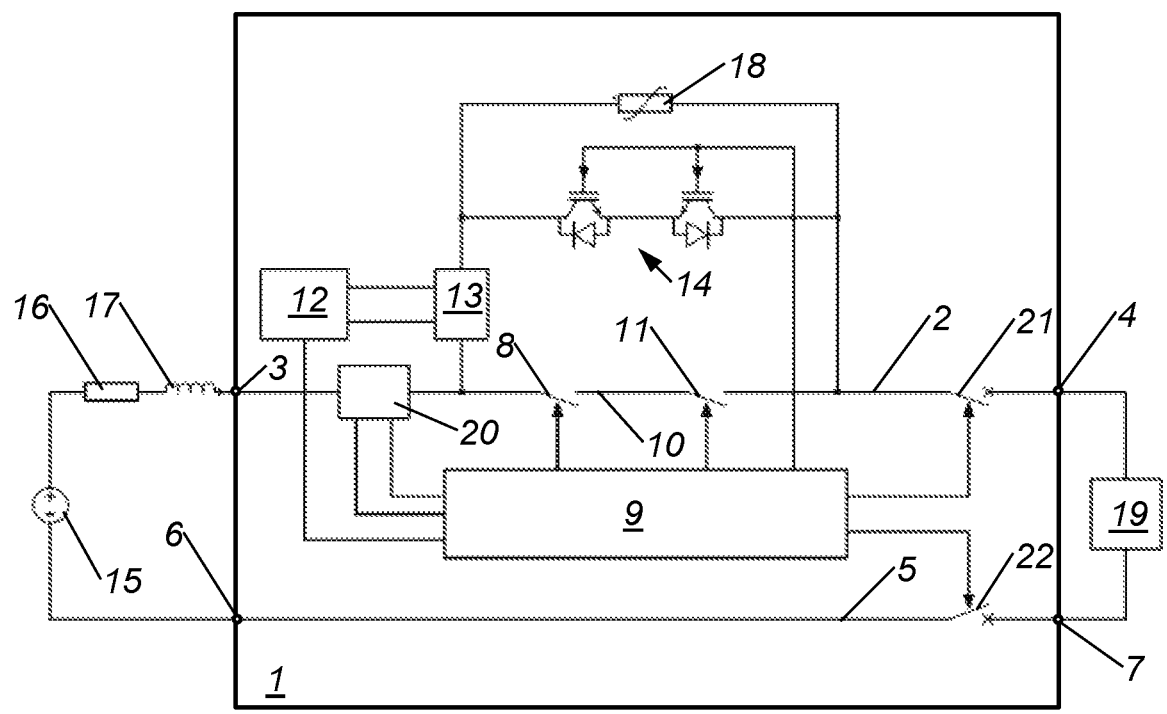

CIRCUIT BREAKER

CROSS-REFERENCE TO PRIOR APPLICATION

Priority is claimed to British Patent Application No. GB 1820015.4, filed on Dec. 7, 2018, the entire disclosure of which is hereby incorporated by reference herein.

FIELD

The present disclosure relates to a circuit breaker.

BACKGROUND

A circuit breaker with a semiconductor switching unit in at least one line and a mechanical bypass-switch connected in parallel to the semiconductor switching unit is also known as "hybrid circuit breaker". A circuit breaker according this concept is described in WO2015/028634 by the applicant.

For a switch off operation the bypass switch opens, what causes the current to commutate to the semiconductor path. The current then would be switched off by the semiconductor switching unit. The arc voltage between the mechanical contacts of the mechanical switch is required for a current commutation from the mechanical switch to the semiconductor switching unit. After the current commutation, the contacts of the mechanical switch have to reach a distance great enough that an arc between them will not reignite when a surge voltage appears at a turn off of the semiconductor switching unit. After the opening of the contacts and the extinguishing of the arc, the temperature of the gas and/or plasma inside the mechanical switch decreases, and the dielectric strength of the air between the contacts will recover. The semiconductor switching unit has to conduct the commutated current until the mechanical switch reaches a minimum dielectric strength.

Switching off of the semiconductor switching unit causes a voltage rise in a metal-oxide-varistor (MOV) connected in parallel to the mechanical switch and the semiconductor switching unit. If the semiconductor switching unit switches off before the dielectric strength of the mechanical switch is high enough, an arc will reignite between the contacts of the mechanical switch.

As a drawback of the known concept, it is necessary to wait until the mechanical bypass switch reaches the required dielectric strength, before a current can be switches off by the semiconductor switching unit. During this time the value of a short current still rises, causing electrical and thermal stress. Therefore it is necessary to provide the semiconductor switching unit with semiconductors, which are able to switch high currents and which are suitable for high currents and high power losses. Usually the internal resistance and the physical dimensions of such semiconductors are higher compared to semiconductors with lower switching capabilities. Higher internal resistance additionally increases the heat generated by the semiconductors.

Further a Hybrid Circuit Breaker with two or more mechanical switches connected in series. All of these switches are operated to open at the same time. It turned out that this concept will not lower the necessary current conduction time for the semiconductor switching unit. The contacts of the separate serial switches will not operate at the exact same time. This results in a longer current commutation time.

SUMMARY

In an embodiment, the present invention provides a circuit breaker, comprising: a live line between a live supply connecting terminal and a live load connecting terminal; a neutral line between a neutral supply connecting terminal and a neutral load connecting terminal; a processing unit; a semiconductor switching unit located in the live line; and a bypass line, which bypass line is connected in parallel to the semiconductor switching unit, with a first mechanical switch and a second mechanical switch located in the bypass line, with the first mechanical switch connected in series to the second mechanical switch, the semiconductor switching unit, the first mechanical switch, and the second mechanical being controlled by the processing unit, wherein the processing unit, in case of a short-circuit-detection or an over-current-detection, is configured to: send a first opening command to the first mechanical switch, and send a second opening command to the second mechanical switch a time-delay after sending of the first opening command.

BRIEF DESCRIPTION OF THE DRAWINGS

The present invention will be described in even greater detail below based on the exemplary FIGURES. The invention is not limited to the exemplary embodiments. Other features and advantages of various embodiments of the present invention will become apparent by reading the following detailed description with reference to the attached drawings which illustrate the following:

The FIG. shows a preferred embodiment of a circuit breaker according to the present invention.

DETAILED DESCRIPTION

In an embodiment, the present invention provides a circuit breaker which can switch off a short circuit in short time, with low thermal and electrical stress.

As a reason the current conduction time of the solid state semiconductor switching unit, after current commutation from the first mechanical switch, is reduced. A shorter current conduction time reduces electrical and thermal stress on all electrical components of the circuit breaker and the electrical network protected by the circuit breaker.

As the second mechanical switch opens without current, no arc and no arc plasma will be created between the contacts of the second mechanical switch. Especially it is not necessary to wait until the switch, respective the gas or the plasma inside the switch cools down. Therefore the dielectric strength, which is necessary for switching off the current by the semiconductor unit, will be reached immediately after the contacts were opened. For instance the necessary air gab distances given in EN 60664-1:2003 table A.1 can be considered.

As a result the necessary dielectric strength can be reached earlier compared to a single mechanical switch or multiple serial mechanical switches operated at the same time.

As a result it is possible to switch off the semiconductor switching unit just after the contacts of the second mechanical switch reached enough distance. A short current can be switched off as long as it is small compared to the described state of the art. It turned out that the current conduction time of the semiconductor switching unit can be reduced 80% compared to a circuit breaker according WO2015/028634. As a further reason it is possible to use semiconductors with low maximum switching capability and low physical dimensions.

As a further result the second mechanical switch can act as a backup for the first mechanical switch.

The FIG. shows a preferred embodiment of a circuit breaker 1 comprising a live line 2 between a live supply connecting terminal 3 and a live load connecting terminal 4, a neutral line 5 between a neutral supply connecting terminal 6 and a neutral load connecting terminal 7, and a semiconductor switching unit 14 located in the live line 2, the circuit breaker 1 further comprises a bypass line 10, which bypass line 10 is connected in parallel to the semiconductor switching unit 14, with a first mechanical switch 8 and a second mechanical switch 11 located in the bypass line 10, with the first mechanical switch 8 connected in series to the second mechanical switch 11, whereby the semiconductor switching unit 14, the first mechanical switch 8 and the second mechanical switch 11 are controlled by a processing unit 9 of the circuit breaker 1, whereby the processing unit 9 is embodied to perform following steps in case of a short-circuit-detection or an overcurrent-detection:

sending a first opening command to the first mechanical switch 8, sending a second opening command to the second mechanical switch 11 a time-delay after sending of the first opening command.

As a reason the current conduction time of the solid state semiconductor switching unit 14, after current commutation from the first mechanical switch 8, is reduced. A shorter current conduction time reduces electrical and thermal stress on all electrical components of the circuit breaker 1 and the electrical network protected by the circuit breaker 1.

As the second mechanical 11 switch opens without current, no arc and no arc plasma will be created between the contacts of the second mechanical switch 11. Especially it is not necessary to wait until the second mechanical switch 11, respective the gas or the plasma inside the switch cools down. Therefore the dielectric strength, which is necessary for switching off the current by the semiconductor switching unit 14, will be reached immediately after the contacts of the second mechanical switch 11 were opened. For instance the necessary air gab distances given in EN 60664-1:2003 table A.1 can be considered.

As a result the necessary dielectric strength can be reached earlier compared to a single bypass-switch or multiple serial bypass-switches operated at the same time.

As a result it is possible to switch off the semiconductor switching unit 14 just after the contacts of the second mechanical switch 11 reached enough distance. A short current can be switched off as long as it is small compared to the described state of the art. It turned out that the current conduction time of the semiconductor switching unit 14 can be reduced 80% compared to a circuit breaker according WO2015/028634. As a further reason it is possible to use semiconductors with low maximum switching capability and low physical dimensions.

As a further result the second mechanical switch 11 can act as a backup for the first mechanical switch 8.

The actual circuit breaker 1 is a low voltage AC or DC circuit breaker 1.

The circuit breaker 1 comprises at least two electric connections through the circuit breaker 1. A first electric connection or live line 2 connects a live supply connecting terminal 3 of the circuit breaker 1 with a live load connecting terminal 4 of the circuit breaker 1. A second electric connection or neutral line 5 connects a neutral supply connecting terminal 6 with a neutral load connecting terminal 7. In case of direct current one of these two lines is a line for positive polarity and the other line is indented for negative polarity. The circuit breaker 1 can comprise further lines, especially for multi-phase applications.

The circuit breaker 1 comprises a semiconductor switching unit 14 located in the first or live line 2. The semiconductor switching unit 14 is preferable embodied as 4Q-switching arrangement. Especially the semiconductor switching unit 14 comprises IGBTs, preferably Back-to-Back IGBTs with anti-parallel diodes, or MOSFETs.

A varistor 18 respective a metal-oxide-varistor (MOV) is connected in parallel to the semiconductor switching unit 14.

A bypass line 10 is connected in parallel to the semiconductor switching unit 14. The bypass line 10 contains a first mechanical switch 8 and a second mechanical switch 11, with the first mechanical switch 8 connected in series to the second mechanical switch 11.

According to a preferred embodiment both mechanical switches 8, 11 are embodied essentially identical. The mechanical switches 8, 11 are typically embodied as electric relays respective electro-mechanical switches with a very short opening time, also known as ultra-fast relays. A typical contact opening speed for a preferred embodiment for a first and/or second mechanical switch 8, 11 is in the range of 5 m/s to 20 m/s (μm/μs). A typical reaction time for a first and/or second mechanical switch 8, 11 is in the range of 100 μs to 300 μs. A typical contact distance for a first and/or second mechanical switch 8, 11 is in the range of 1 mm. The opening time for a first and/or second mechanical switch 8, 11 is typically The first mechanical switch 8 may also be called bypass-switch or arcing-switch.

The second mechanical switch 11 may also be called dielectric-switch.

The first mechanical switch 8 and the second mechanical switch 11 are controlled by a processing unit 9 of the circuit breaker 1.

The circuit breaker 1 can comprise at least a third mechanical switch connected in series to the first mechanical switch 8 and the second mechanical switch 11, and controlled by the processing unit 9. The invention is further described with two mechanical switches 8, 11.

A circuit breaker 1 according to the described features, but only with one mechanical switch 8, called bypass-switch, is known from the WO 2015/028634 A1 of the applicant.

In normal operation both mechanical switches 8, 11 are in closed state, and an electric current from the supply, as shown in the FIG. by the source 15 and the internal resistance 16 and internal inductance 17 of the source 15 respective an electric grid, to the load 19 passes the circuit breaker 1 via the first mechanical switch 8 and the second mechanical switch 11.

According to the preferred embodiment the circuit breaker 1 further contains a first and a second galvanic separation relay 21, 22, which are also controlled by the processing unit 9.

The circuit breaker 1 is embodied to detect a short circuit and/or an overcurrent. Preferable the function of overcurrent-detection is embodied by using a shunt resistance 20 in the live line 2 for current measurement. According to the preferred embodiment the short circuit detection is embodied as a part of a driver circuit of the semiconductor switching unit 14. A short circuit would cause a desaturation of the semiconductors, which would be detected by the driver circuit, as further described in WO 2015/028634 A1.

The shunt resistance 20 and/or the driver circuit are connected to the processing unit 9.

In case of a short-circuit-detection or an overcurrent-detection the processing unit 9 sends a first opening command to the first mechanical switch 8. By opening of the first mechanical switch 8 the current commutates to the semiconductor switching unit 14.

A time-delay after the sending of the first opening command, the processing unit 9 sends a second opening command to the second mechanical switch 11. As already described, by opening of the second mechanical switch 11 the sufficient dielectric strength will be reached in a shorter time. Afterwards the processing unit 9 initiates the switching off of the semiconductor switching unit 14.

In case that the circuit breaker 1 should switch off an operative or working current, the processing unit 9 initiates only the opening of the first mechanical switch 8.

According to a first embodiment the time-delay is a predefined constant time-delay. A constant time-delay is easy to implement, and further ensures a fail safe operation of the second mechanical switch 11. In case the first mechanical switch 8 does not open, as a reason of a malfunction, the second mechanical switch 11 will open after the time-delay automatically.

The duration of this constant time-delay can be determined by the typical duration of the commutation time for a specific type of circuit breaker 1 with an additional tolerance.

According to a second embodiment the time-delay is a variable time-delay. According to this embodiment the second opening command is sent after a sufficient amount of commutation of the current to the semiconductor switching unit 14.

According to the second preferred embodiment the circuit breaker 1 comprises a commutation detection arrangement 12 to detect at least the beginning of a current commutation from the bypass line 10 to the semiconductor switching unit 14, with the commutation detection arrangement 12 being connected to the processing unit 9. The commutation detection arrangement 12 can be implemented as a part of the driver circuit of the semiconductor switching unit 14 and/or as a separate unit. In the latter case the commutation detection arrangement 12 may not be a separate unit but it can be implemented by a combination of the driver circuit and the processing unit 9.

The embodiment according to the only FIG. shows a current measurement unit 13 connected in series to the semiconductor switching unit 14 and in parallel to the bypass line 10 as a part of the commutation detection arrangement 12.

According to a first preferred variation of the second embodiment, the variable time-delay is defined as the period until the commutation detection arrangement 12 detects a predefined level of commutation of a current from the bypass line 10 to the semiconductor switching unit 14. In this case the processing unit 9 waits until this level is reached and sends the second opening command afterwards.

According to a second preferred variation of the second embodiment the variable time-delay is defined as an expected commutation time minus a reaction time period of the second mechanical switch 11. This variation takes the signal traveling time within the circuit breaker 1 as well as the inertia and inherent delays of the second bypass-switch 11 into consideration. The reaction time of the second mechanical switch 11 is usually well known for one special type of mechanical switch 11.

In this context the expected commutation time will preferably be estimated by the processing unit 9 under consideration of a variation in time of a current in the live line 2 and/or a current in the bypass line 10. The signals describing the variation in time are delivered by the commutation detection arrangement 12.

According to a third embodiment, the first and the second embodiments are combined in a way, that the processing unit 9 is embodied to send the second opening command after the constant time-delay in case, that the variably time-delay is longer than the constant time-delay. If the variable time-delay is shorter than the constant time-delay, the processing unit 9 sends the second opening command after the variable time-delay. The third embodiment combines the advantages of the possibility of a short switch off time according to the second embodiment with the safety of the first embodiment.

If the circuit breaker contains a status-detector or other means for detecting the switching-state of at least the first mechanical switch 8, it can preferably be provided, that the processing unit 9 is embodied to send the second opening command if, respective as soon as, it is detected, that the first mechanical switch 8 did not open in reaction to the first opening command, to ensure to switch off a detected short circuit current in short time.

According to a third embodiment, the first and the second embodiments are combined in a way, that the processing unit 9 is embodied to send the second opening command after the constant time-delay in case, that the variable time-delay is longer than the constant time-delay. If the variable time-delay is shorter than the constant time-delay, the processing unit 9 sends the second opening command after the variable time-delay. The third embodiment combines the advantages of the possibility of a short switch off time according to the second embodiment with the safety of the first embodiment.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A circuit breaker, comprising:
a live line between a live supply connecting terminal and a live load connecting terminal;
a neutral line between a neutral supply connecting terminal and a neutral load connecting terminal;
a processing unit;
a semiconductor switching unit located in the live line;
a bypass line, which bypass line is connected in parallel to the semiconductor switching unit, with a first mechanical switch and a second mechanical switch located in the bypass line, with the first mechanical switch connected in series to the second mechanical switch, the semiconductor switching unit, the first mechanical switch, and the second mechanical switch being controlled by the processing unit; and a commutation detection arrangement configured to detect at least a beginning of a current commutation from the bypass line to the semiconductor switching unit, the commutation detection arrangement being connected to the processing unit, wherein the processing unit, in case of a short-circuit-detection or an overcurrent-detection, is configured to:

send a first opening command to the first mechanical switch, and send a second opening command to the second mechanical switch a time-delay after sending of the first opening command.

2. The circuit breaker according to claim 1, wherein the time-delay comprises a predefined constant time-delay.

3. The circuit breaker according to claim 1, wherein the commutation detection arrangement comprises a current measurement unit connected in series to the semiconductor switching unit and in parallel to the bypass line.

4. The circuit breaker according to claim 1 wherein the time-delay comprises a variable time-delay.

5. The circuit breaker according to claim 4, wherein the variable time-delay is defined as a period until the commutation detection arrangement detects a predefined level of commutation of a current from the bypass line to the semiconductor switching unit.

6. The circuit breaker according to claim 4, wherein the variable time-delay is defined as an expected commutation time minus a reaction time period of the second mechanical switch.

7. The circuit breaker according to claim 6, wherein the processing unit is configured to estimate the expected commutation time under consideration of a variation in time of a current in the live line and/or a current in the bypass line.

8. The circuit breaker according to claim 4, wherein the time-delay comprises a predefined constant time-delay, and wherein the processing unit is configured to send the second opening command after the constant time-delay when the variable time-delay is longer than the constant time-delay.

9. The circuit breaker according to claim 1, wherein the processing unit is configured to send the second opening command if the first mechanical switch does not open in reaction to the first opening command.

10. The circuit breaker according to claim 1, wherein the first mechanical switch and the second mechanical switch are essentially identical.

* * * * *